United States Patent
Lowe et al.

[11] Patent Number: 5,896,184
[45] Date of Patent: Apr. 20, 1999

[54] TEMPLE ORNAMENTATION FOR EYE GLASSES

[76] Inventors: Laura Lynn Lowe, 2516 Burgener Blvd., San Diego, Calif. 92110; Elena Kron, 5091 Via Playa Los Santos, San Diego, Calif. 92124

[21] Appl. No.: 08/904,986

[22] Filed: Aug. 1, 1997

[51] Int. Cl.[6] ............................ G02C 11/02; A44C 13/00
[52] U.S. Cl. ........................ 351/52; 63/1.11; 63/1.18
[58] Field of Search ....................... 351/51, 52, 158; 63/1.11, 1.18, FOR 100

[56] References Cited

U.S. PATENT DOCUMENTS 5,024,515  6/1991  Beckemeyer et al. ............... 351/52
5,161,234  11/1992  Nitta ............................ 351/52
5,675,988  10/1997  Ignatowski ...................... 351/52

*Primary Examiner*—Huy Mai
*Attorney, Agent, or Firm*—Frank D. Gilliam

[57] ABSTRACT

This invention is directed to ornamentation for the temple pieces of ordinary eye glasses. In a first embodiment a resilient "O" ring is sized to grip the temple piece(s). An ornament of a selected shape or form is connected to the "O" ring via one or more links of a chain so that the ornament dangles and faces a selected orientation relative to the longitudinal length of the temple pieces. In a second embodiment, the "O" ring loosely fits the temple piece and a pair of temple piece griping "O" ring are positioned on either side of the loosely fitting "O" ring to limit the free translation of the loose fitting "O" ring. Chain links are attached to the loose fitting "O" ring as herein before mentioned includes a selected orientation ornament.

5 Claims, 1 Drawing Sheet

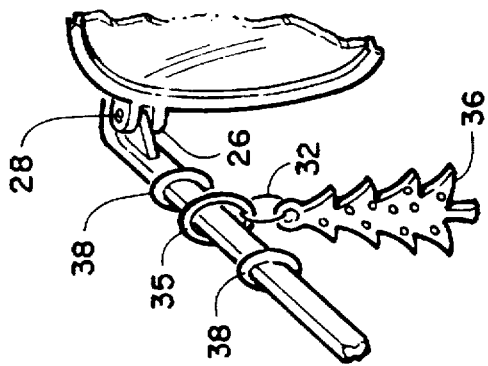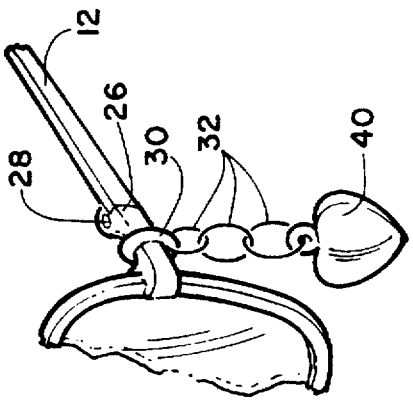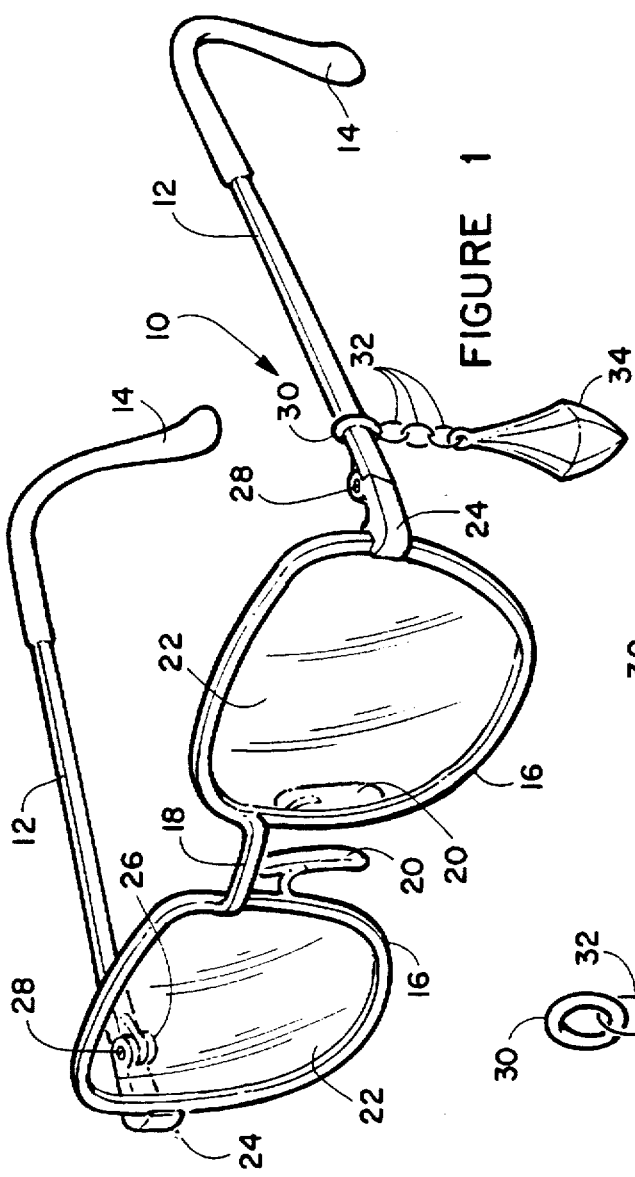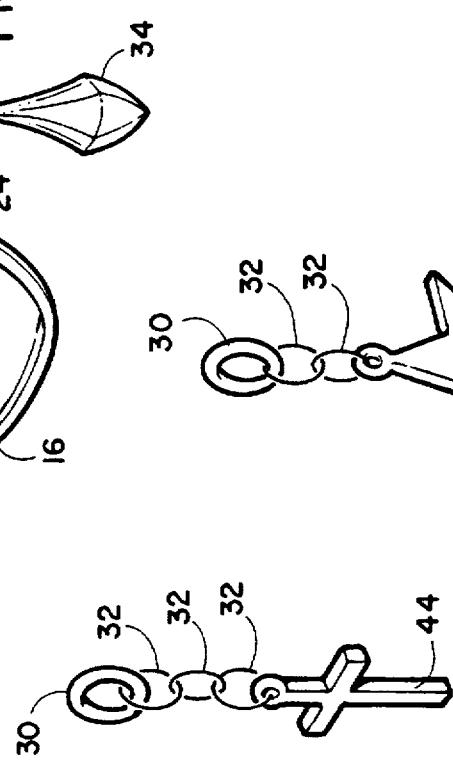

TEMPLE ORNAMENTATION FOR EYE GLASSES

BACKGROUND OF THE INVENTION

This invention is directed to ornaments for eyeglasses, namely a first resilient "O" ring for removable attachment of ornaments along the temple portion of the eye glasses. The first resilient "O" ring can be the same color as the temple piece or a contrasting color. The attachment member can either tightly grip the temple and remain at a selected location along the length of the temple or be loosely attached to allow for selective movement along the length of the temple. A pair of secondary "O" rings being colored to match the color of the temple or the first "O" ring or colored to contrast with the color of the temple or first "O" ring, tightly grip the temple and are located in a spaced apart position along the temple to allow the oversized first "O" ring freedom of movement between the spaced apart pair of second "O" rings.

U.S. Pat. No. 2,960,787 by inventor Quinones et al. Teaches means for mounting an ornament that is fixed in place and requires altering the eye glasses to accommodate an ornament.

U.S. Pat. No. 3,010,365 by inventor Sadel teaches attachment to the distal ends of the temples (ear pieces) of eyeglasses for the purpose of maintaining the eye glasses to the wearer during sporting events. Ornamentation is added to the ear piece attachments.

U.S. Pat. No. 4,968,128 by inventor Mendola teaches a removable fixed in position rigid hinged metal clip for attaching ornamentation to the temple of eye gasses.

U.S. Pat. No. 4,974,955 by inventor Treadaway and U.S. Pat. No. 4,153,346 teaches attaching ornaments to the distal end or ear attachment end of the temple.

United States patent by inventor Nitta teaches attaching ornaments to the screw utilized to connect the temple to the lens frame of eye glasses.

U.S. Pat. No. 5,497,211 by inventor McNulty teaches a generally planar surface member with slots that can be attached to the temple piece of eye glasses to display a pennant or the like.

Applicant's invention provides a new and unique attachment of ornamentation to the temple piece of eye glasses.

SUMMARY OF THE INVENTION

Applicants'ornament attachment device in one embodiment provides a unique resilient "0" ring attachment member that can be used on a wide range of differently dimensioned eye glass temple pieces for the purpose intended and because of its resilient construction can be stretched through a plurality of sizes for gripping different sized temple pieces.

In a second embodiment, Applicants'first resilient "O" ring is of a size selected to be larger in diameter that the temple piece so that it will be free to translate along the temple piece.

It is an object of the present invention to provide a unique means for attaching ornamentation to the temple piece of eye glasses that can be utilized on different cross sectional dimensioned temple pieces.

Another object of this invention is to provide a unique ornament attachment means that will grip an eye glass temple piece and thereby remain fixed in a selected location along the temple piece regardless of the cross sectional dimension of the temple piece.

Yet another object of this invention is to provide a unique ornamentation attachment means for the temple pieces of eye glasses of different cross sectional dimension that is free to translate along a selected length of an eye glass temple piece.

Still another object of this invention is to provide removable fixed in place stops to limit the free translation of the ornamentation along a selected portion of an eyeglass temple.

These objects, together with other objects ans advantages which will be subsequently apparent, reside in the details of construction and operation, as more fully herein after described and claimed, reference being had to the accompanying drawings forming a part hereof, wherein the reference numerals refer to like parts throughout.

BRIEF DESCRIPTION OF THE DRAWING FIGURES

FIG. 1 is a perspective showing depicting a pair of glasses with the ornamentation and securing means of the invention depicted;

FIG. 2 is a cutaway showing of the glasses of FIG. 1 with a second embodiment of the ornamentation and attachment means;

FIG. 3 is a cutaway showing of the glasses of FIG. 1 with a third embodiment of the ornamentation and attachment means;

FIG. 4 is a cutaway showing of the glasses of FIG. 1 with a fourth embodiment of the ornamentation and attachment means; and FIG. 5 is a cutaway showing of the glasses of FIG. 1 with a fifth embodiment of the ornamentation and attachment means.

DETAILED DESCRIPTION OF THE PREFERRED EMBODIMENTS

Referring now specifically to drawing FIG. 1, a pair of eye glasses 10 comprise a pair of temple pieces 12, each having an ear retaining end 14, a lens frame 16 interconnected by a lens frame connector 18. Nose cushions 20 and lens 22. The temple pieces pivotally attach to the lens frame 16 through a lens frame extension 24. The hinge 26 has a conventional pin 28 interconnect between the lens frame extension and the temple piece.

A first resilient "O" ring 30 of a diameter slightly smaller that the cross sectional dimension of the temple piece is stretched over the end 14 of the temple piece 12 and forced along the temple piece to a desired location where it grips the temple piece and thereby remains fixed in place until again physically moved. Attached to the "O" ring 30 is a chain of rigid links 32 generally of metal or plastic which are inter connected and have an ornament 34 loosely attached to the distal most loop. The ornament 34 taking the shape of faceted jewel.

Referring now specifically to drawing FIG. 2. In this embodiment a first "O" ring 35 is loosely connected to the temple piece 12 allowing the "O" ring, rigid links 32 and the ornament 36 to freely translate along the temple piece 12. Secondary "O" rings 38 which are of a smaller diameter than the cross section of the temple piece 12 are stretched over the temple piece end 14 and forced along the temple piece to locations on either side of the loose first "O" ring 35 wherein they grip the temple piece and trap the movement of the "O" ring 35 between the secondary "O" rings 38. The "O" rings 30, 36 and 38 can be colored to match or colored to contrast the color of the temple piece or lens frame or each other.

The "O" rings 30, 36 and 38 are formed from any suitable resilient material such as neoprene, natural rubber, synthetic rubber, or the like suitable for the purpose intended.

Referring now to drawing FIG. 3, an ornament in the shape of a heart 40 is shown.

Drawing FIG. 3, depicts a star shaped ornament 42.

Drawing FIG. 4 depicts a cross shaped ornament 44.

It should be noted that the number of links in the chain determine the direction of orientation of the ornament and the number of links is selected accordingly generally when a single links 32 or an odd number of links 32 form a chain for attaching an ornament the ornament will face the side of the temple piece and when two or an even number of links 32 form a chain for attaching an ornament so that the ornament will face the front of the glasses normal to the length of the temple piece.

Having described the invention in detail and by reference to the drawing Figures, it will be apparent that no modifications are possible without departing from the spirit and scope of this invention defined by the following claims.

What is claimed is:

1. Apparatus for ornament attachment to the temple of eye glasses comprising:

a resilient first "O" ring;

an additional pair of second "O" rings one being positioned on each side of said first "O" ring, said pair of second "O" rings having a diameter smaller than said cross section of said temple piece for gripping said temple piece in a spaced apart relationship and said first "O" ring having a diameter greater than the diameter of said temple piece thereby allowing said first "O" ring freedom to translate between said second pair of spaced apart second "O" rings and be contained therebetween.

2. The invention as defined in claim 1 wherein said eye glasses have a colored frame and said pair of second "O" rings are the same color as said frame.

3. The invention as defined in claim 1 wherein said eye glasses have a colored frame and said pair of second "O" rings are of a different color then said frame.

4. The invention as defined in claim 1 wherein said first and pair of second "O" rings are of a different color.

5. Apparatus for ornament attachment to the temple of eye glasses comprising:

an "O" ring suitably sized for free movement along said temple;

a chain having at least one link, said at least one link being attached to said "O" ring; and an ornament connected to the at least one link at the distal end of said chain.

* * * * *